United States Patent
Gao et al.

(10) Patent No.: US 12,447,527 B2
(45) Date of Patent: Oct. 21, 2025

(54) NICKEL-CARBON COMPOSITE AND PREPARATION METHOD AND USE THEREOF

(71) Applicant: ANHUI UNIVERSITY OF SCIENCE & TECHNOLOGY, Anhui (CN)

(72) Inventors: Shengtao Gao, Anhui (CN); Yuanchun Zhang, Anhui (CN)

(73) Assignee: ANHUI UNIVERSITY OF SCIENCE & TECHNOLOGY, Anhui (CN)

( * ) Notice: Subject to any disclaimer, the term of this patent is extended or adjusted under 35 U.S.C. 154(b) by 0 days.

(21) Appl. No.: 18/034,904

(22) PCT Filed: Feb. 16, 2023

(86) PCT No.: PCT/CN2023/076407
§ 371 (c)(1),
(2) Date: May 2, 2023

(87) PCT Pub. No.: WO2024/168669
PCT Pub. Date: Aug. 22, 2024

(65) Prior Publication Data
US 2025/0073777 A1    Mar. 6, 2025

(51) Int. Cl.
*B22F 1/16*    (2022.01)
*B22F 1/054*    (2022.01)
*B22F 9/24*    (2006.01)

(52) U.S. Cl.
CPC ............... *B22F 1/16* (2022.01); *B22F 1/054* (2022.01); *B22F 9/24* (2013.01); *B22F 2201/013* (2013.01); *B22F 2201/11* (2013.01); *B22F 2301/15* (2013.01); *B22F 2302/40* (2013.01); *B22F 2304/054* (2013.01)

(58) Field of Classification Search
None
See application file for complete search history.

(56) References Cited

U.S. PATENT DOCUMENTS

2022/0274844 A1    9/2022    Ning et al.
2022/0380609 A1    12/2022    Li et al.

FOREIGN PATENT DOCUMENTS

CN    113088252 A    7/2021
CN    112996375 A    3/2022

OTHER PUBLICATIONS

International Search Report for PCT/CN2023/076407.
Yuanchun Zhang, "Metal-organic framework derived magnetic carbon Ni@C octahedron composite as an excellent microwave absorber", Composites Communications 31 (2022) 101135, published at https://www.sciencedirect.com/journal/composites-communications.

*Primary Examiner* — Cheng Yuan Huang
(74) *Attorney, Agent, or Firm* — Bauer and Joseph; Thomas Joseph

(57) ABSTRACT

Wave-absorbing materials in the form of a nickel-carbon composite that includes a plurality of modified carbon particles, where each of the modified carbon particles includes a nickel nanoparticle core and a carbon layer wrapped on a surface of the nickel nanoparticle core; and a plurality of the modified carbon particles form an octahedral structure. When a high-frequency microwave interacts with the nickel-carbon composite, the composite has a stronger magnetic loss performance due to various magnetic loss characteristics such as natural resonance and eddy current loss of the magnetic nickel nanoparticles. In addition, the carbon layer, as a shell layer, can provide a directional electron migration path in a special octahedral space structure to construct a conductive network.

6 Claims, 15 Drawing Sheets

NICKEL-CARBON COMPOSITE AND PREPARATION METHOD AND USE THEREOF

CROSS REFERENCE TO RELATED APPLICATION

The present application is a U.S. national stage application of PCT International Application No. PCT/CN2023/076407, filed Feb. 16, 2023. The disclosure of which is hereby incorporated by reference in its entirety into the present application.

TECHNICAL FIELD

The present disclosure belongs to the technical field of wave-absorbing materials, and in particular relates to a nickel-carbon composite and a preparation method and use thereof.

BACKGROUND ART

Wave-absorbing materials refer to a class of materials that can absorb and attenuate incident electromagnetic waves, convert electromagnetic energy into heat energy, and dissipate the heat energy, or that make the electromagnetic waves disappear through interference effects. The development of high-performance wave-absorbing materials is of great significance in the fields of national defense, military affairs, and wireless communication technology.

To improve the effectiveness of microwave-absorbing materials, the microwave-absorbing materials that can generate multiple loss mechanisms should be constructed. These mechanisms can allow as much electromagnetic waves as possible to enter an interior of the material for attenuation, thereby achieving the requirements of strong absorption, broadband, and high-temperature resistance. In this way, a microwave-absorbing material with excellent performances is obtained. According to electromagnetic theory, electromagnetic wave loss depends on the intrinsic dielectric loss and magnetic loss capabilities of materials, and a wave-absorbing ability of the materials can be changed through a desirable impedance matching capability.

The traditional wave-absorbing material is a ferrite magnetic wave-absorbing material, which can effectively attenuate and absorb the electromagnetic waves through two forms of magnetic loss and dielectric loss. However, the current ferrite wave-absorbing materials still have a poor electromagnetic wave-absorbing performance.

SUMMARY

The following summary is provided to introduce a selection of concepts in a simplified form that are further described below in the detailed description. This summary is not intended to identify key features or essential features of the claimed subject matter, nor is it intended to be used to limit the scope of the claimed subject matter.

In various implementations, a nickel-carbon composite and a preparation method and use thereof are provided. In the present disclosure, the nickel-carbon composite has an excellent electromagnetic wave-absorbing performance.

To achieve various objectives, the present disclosure provides the following technical solutions:

The present disclosure provides a nickel-carbon composite, including a plurality of modified carbon particles, where each of the modified carbon particles includes a nickel nanoparticle core and a carbon layer wrapped on a surface of the nickel nanoparticle core; and a plurality of the modified carbon particles forms an octahedral structure.

In some embodiments, the octahedral structure has an edge length of 0.5 μm to 2.0 μm.

In some embodiments, the nickel nanoparticle has a particle size of 5 nm to 20 nm.

In some embodiments, the nickel nanoparticles have a mass percentage of 5% to 20% in the nickel-carbon composite.

In some embodiments, the nickel-carbon composite has a particle size of 0.7 μm to 3.0 μm.

In some embodiments, the nickel-carbon composite has a density of 0.318 g/cm3 to 0.389 g/cm3.

The present disclosure further provides a preparation method of the nickel-carbon composite, including the following steps:

mixing a soluble nickel salt, dimethylimidazole, and trimesic acid with a polar organic solvent, and conducting a solvothermal reaction to obtain a nickel-based metal-organic framework (MOF) precursor; and subjecting the nickel-based MOF precursor to a heat treatment in a mixed atmosphere of hydrogen and argon to obtain the nickel-carbon composite.

In some embodiments, the soluble nickel salt, the dimethylimidazole, and the trimesic acid are at a mass ratio of (0.291-0.456):(0.22-0.68):(0.32-1.45); and the soluble nickel salt and the polar organic solvent are at a dosage ratio of (0.291-0.456) g:(70-95) mL.

In some embodiments, the solvothermal reaction is conducted at 180° C. to 260° C. for 48 h to 96 h.

In some embodiments, the heat treatment is conducted at 650° C. to 750° C. for 5 h to 8 h.

In some embodiments, a temperature rise for the heat treatment is 5° C./min to 20° C./min.

In some embodiments, the hydrogen and the argon are at a volume ratio of 5:95.

The present disclosure further provides use of the nickel-carbon composite or a nickel-carbon composite prepared by the preparation method as a wave-absorbing material.

The present disclosure provides a nickel-carbon composite, including a plurality of modified carbon particles, where each of the modified carbon particles includes a nickel nanoparticle core and a carbon layer wrapped on a surface of the nickel nanoparticle core; and a plurality of the modified carbon particles form an octahedral structure. In the present disclosure, when high-frequency microwave interacts with the nickel-carbon composite, the composite has a stronger magnetic loss performance due to various magnetic loss characteristics such as natural resonance and eddy current loss of the magnetic nickel nanoparticles. In addition, the carbon layer as a shell layer can provide a directional electron migration path in a special octahedral space structure to construct a conductive network. The octahedral structure can enhance multiple reflections of electromagnetic waves inside the composite, and enhance the loss through phase cancellation. Moreover, the construction of a special octahedral conduction network is conducive to the generation of conduction loss and polarization loss, thereby enhancing an electromagnetic wave loss capability.

BRIEF DESCRIPTION OF THE DRAWINGS

The accompanying drawings as part of the present disclosure are used to provide a further understanding of the present disclosure, and the exemplary examples and their descriptions are used to illustrate the present disclosure, not to limit the present disclosure improperly.

FIG. 7A to FIG. 7C are electromagnetic parameters; FIG. 7D to FIG. 7F are reflection losses; and FIG. 7G to FIG. 7I are Cole-Cole curves;

DETAILED DESCRIPTION OF THE EMBODIMENTS

Figure 1A:
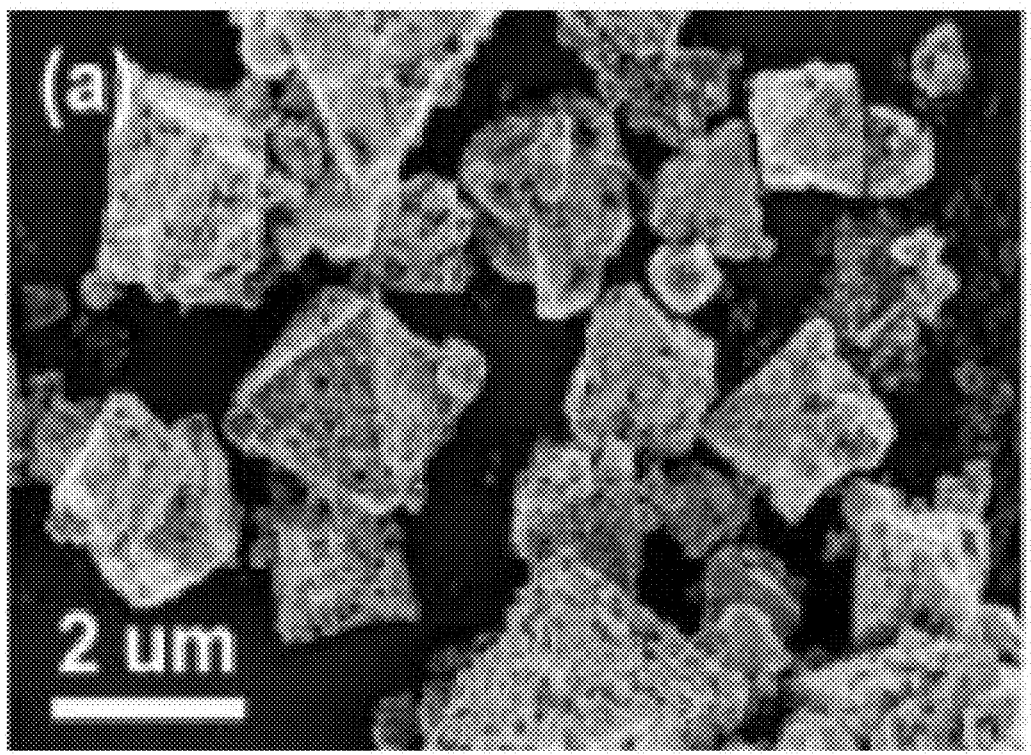
FIGS. 1A-C show scanning electron microscopy (SEM) images of a nickel-carbon composite obtained in Example 1.

The present disclosure will be described in detail with reference to the accompanying drawings and specific examples. The exemplary examples and their descriptions are only used to illustrate the present disclosure, not intended to limit the present disclosure improperly.

It shall be noted that the examples and their features in the present disclosure can be combined with each other without conflict. Hereinafter, the present disclosure will be described in detail with reference to the accompanying drawings and examples.

The present disclosure provides a nickel-carbon composite, including a plurality of modified carbon particles, where each of the modified carbon particles includes a nickel nanoparticle core and a carbon layer wrapped on a surface of the nickel nanoparticle core; and a plurality of the modified carbon particles forms an octahedral structure.

In the present disclosure, the octahedral structure has an edge length of about 0.5 μm to about 2.0 μm in some embodiments, about 0.8 μm to about 1.8 μm in other embodiments, and about 1.0 μm to about 1.5 μm in yet other embodiments. The nickel nanoparticle has a particle size of about 5 nm to about 20 nm in some embodiments, about 8 nm to about 18 nm in other embodiments, and about 10 nm to about 15 nm in yet other embodiments. The nickel nanoparticles have a mass percentage of about 5% to about 20% in some embodiments, about 8% to about 18% in other embodiments, and about 10% to about 15% in yet other embodiments in the nickel-carbon composite.

In the present disclosure, the nickel-carbon composite has a particle size of about 0.7 μm to about 3.0 μm in some embodiments, about 1.2 μm to about 2.5 μm in other embodiments, and about 1.5 μm to about 2.0 μm in yet other embodiments. The nickel-carbon composite has a density of about 0.318 g/cm$^3$ to about 0.389 g/cm$^3$ in some embodiments.

The present disclosure further provides a preparation method of the nickel-carbon composite, including the following steps:

mixing a soluble nickel salt, dimethylimidazole, and trimesic acid with a polar organic solvent, and conducting a solvothermal reaction to obtain a nickel-based metal-organic framework (MOF) precursor; and subjecting the nickel-based MOF precursor to a heat treatment in a mixed atmosphere of hydrogen and argon to obtain the nickel-carbon composite.

In the present disclosure, unless otherwise specified, all raw materials for preparation are commercially available products well known to those skilled in the art.

In the present disclosure, a soluble nickel salt, dimethylimidazole, and trimesic acid are mixed with a polar organic solvent, and a solvothermal reaction is conducted to obtain a nickel-based metal-organic framework (MOF) precursor.

In the present disclosure, the soluble nickel salt includes nickel nitrate hexahydrate in some embodiments. The polar organic solvent includes N,N-dimethylformamide (DMF) in some embodiments.

In the present disclosure, the soluble nickel salt, the dimethylimidazole, and the trimesic acid are at a mass ratio of about (0.291-0.456):(0.22-0.68):(0.32-1.45) in some embodiments, about (0.30-0.42):(0.25-0.65):(0.35-1.40) in other embodiments, and about (0.35-0.40):(0.30-0.60):(0.40-1.30) in other embodiments. The soluble nickel salt and the polar organic solvent are at a dosage ratio of about (0.291-0.456) g:(70-95) mL in some embodiments, about (0.30-0.42) g in some embodiments:(75-90) mL, about (0.35-0.40) g:(80-85) mL in other embodiments.

In the present invention, there is no special limitation on a mixing method, which can be conducted in a manner known to those skilled in the art.

In the present disclosure, the solvothermal reaction is conducted at about 180° C. to about 260° C. in some embodiments, about 200° C. to about 250° C. in other embodiments, and about 220° C. to about 230° C. in yet other embodiments for about 48 to about 96 h in some embodiments, about 54 h to 84 h in other embodiments, and about 65 h to about 72 h in yet other embodiments. The solvothermal reaction can be conducted in a polytetrafluoroethylene-lined autoclave at some embodiments.

In the present disclosure, after the solvothermal reaction, an obtained feed liquid can be subjected to filtering, washing, and drying in sequence. There is no special limitation on processes of the filtering and the washing, and the processes well known to those skilled in the art can be used. The drying can be conducted under vacuum at 60° C. in some embodiments.

In the present disclosure, the nickel-based MOF precursor is subjected to a heat treatment in a mixed atmosphere of hydrogen and argon to obtain the nickel-carbon composite.

In the present disclosure, the heat treatment is conducted at about 650° C. to about 750° C. in some embodiments, about 680° C. to about 730° C. in other embodiments, and about 700° C. to about 720° C. in yet other embodiments for about 5 h to about 8 h in some embodiments, about 6 h to about 7 h in other embodiments. A temperature rise for the heat treatment is about 5° C./min to about 20° C./min in some embodiments, about 8° C./min to about 18° C./min in other embodiments, and about 10° C./min to about 15° C./min in yet other embodiments.

In the present disclosure, the hydrogen and the argon are at a volume ratio of about 5:95 in some embodiments. During the heat treatment, nickel nanoparticles can be generated. Meanwhile, the nickel nanoparticles can catalyze the transformation of the MOF precursor into a graphitized carbon layer.

The present disclosure further provides use of the nickel-carbon composite or a nickel-carbon composite prepared by the preparation method as a wave-absorbing material. In the present disclosure, there is no special limitation on a specific implementation mode of the use, which can be conducted by adopting a process well known to those skilled in the art.

In order to further illustrate the present disclosure, the nickel-carbon composite and the preparation method and the use thereof provided in the present disclosure are described in detail below with reference to examples, but the examples should not be interpreted as a limitation to the protection scope of the present disclosure.

Example 1

0.291 g of nickel nitrate hexahydrate, 0.22 g of dimethylimidazole, and 0.32 g of trimesic acid were dissolved in 70 mL of DMF. An obtained solution was placed in a 100 mL polytetrafluoroethylene-lined autoclave, and a solvothermal reaction was conducted at 180° C. for 48 h. An obtained material liquid was filtered and washed, and then dried under vacuum at 60° C. to obtain a nickel-based MOF precursor.

The nickel-based MOF precursor was heated at 5° C./min to 650° C. to conduct a heat treatment for 5 h in a mixed atmosphere of hydrogen and argon (the hydrogen and the argon were at a volume ratio of 5:95), to obtain a nickel-carbon composite (where nickel nanoparticles had a particle size of 5 nm and a mass percentage of 5%; the nickel-carbon composite had a particle size of 0.7 μm and a density of 0.318 g/cm3).

Figure 9:
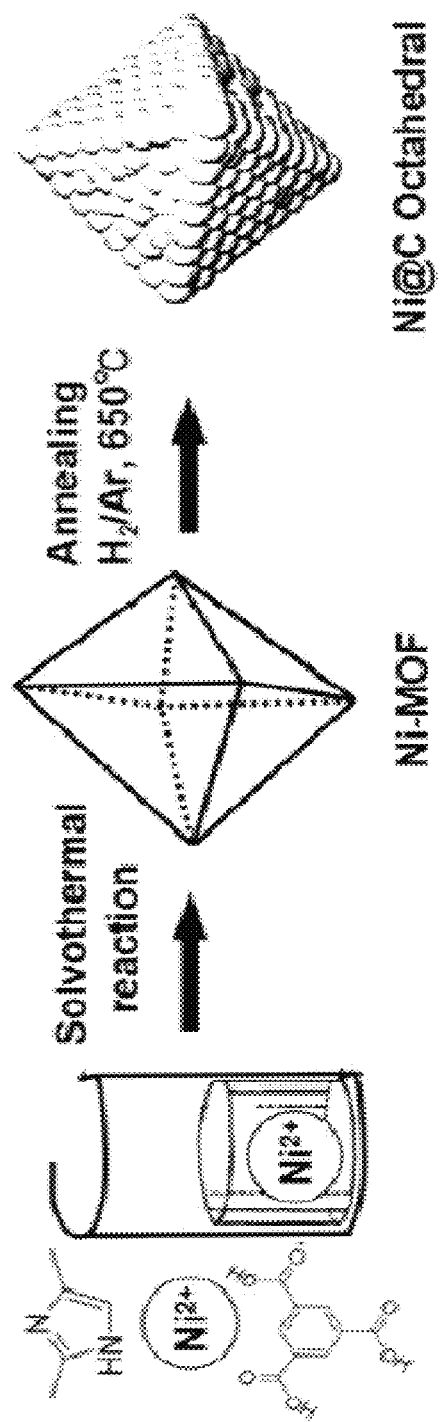
FIG. 9 shows a synthetic route of Example 1.

The preparation method provided in this example had a schematic flow chart shown in FIG. 9.

Example 2

0.456 g of nickel nitrate hexahydrate, 0.68 g of dimethylimidazole, and 1.45 g of trimesic acid were dissolved in 95 mL of DMF. An obtained solution was placed in a 100 mL polytetrafluoroethylene-lined autoclave, and a solvothermal reaction was conducted at 260° C. for 96 h. An obtained material liquid was filtered and washed, and then dried under vacuum at 60° C. to obtain a nickel-based MOF precursor.

The nickel-based MOF precursor was heated at 5° C./min to 750° C. to conduct a heat treatment for 8 h in a mixed atmosphere of hydrogen and argon (the hydrogen and the argon were at a volume ratio of 5:95), to obtain a nickel-carbon composite (where nickel nanoparticles had a particle size of 8 nm and a mass percentage of 9%; the nickel-carbon composite had a particle size of 0.9 μm and a density of 0.389 g/cm3).

Example 3

0.356 g of nickel nitrate hexahydrate, 0.68 g of dimethylimidazole, and 0.345 g of trimesic acid were dissolved in 85 mL of DMF. An obtained solution was placed in a 100 mL polytetrafluoroethylene-lined autoclave, and a solvothermal reaction was conducted at 205° C. for 72 h. An obtained material liquid was filtered and washed, and then dried under vacuum at 60° C. to obtain a nickel-based MOF precursor.

The nickel-based MOF precursor was heated at 10° C./min to 680° C. to conduct a heat treatment for 5.5 h in a mixed atmosphere of hydrogen and argon (the hydrogen and the argon were at a volume ratio of 5:95), to obtain a nickel-carbon composite (where nickel nanoparticles had a particle size of 10 nm and a mass percentage of 12%; the nickel-carbon composite had a particle size of 1.4 μm and a density of 0.328 g/cm$^3$).

Example 4

0.411 g of nickel nitrate hexahydrate, 0.52 g of dimethylimidazole, and 0.965 g of trimesic acid were dissolved in 80 mL of DMF. An obtained solution was placed in a 100 mL polytetrafluoroethylene-lined autoclave, and a solvothermal reaction was conducted at 205° C. for 65 h. An obtained material liquid was filtered and washed, and then dried under vacuum at 60° C. to obtain a nickel-based MOF precursor.

The nickel-based MOF precursor was heated at 12° C./min to 700° C. to conduct a heat treatment for 6.5 h in a mixed atmosphere of hydrogen and argon (the hydrogen and the argon were at a volume ratio of 5:95), to obtain a nickel-carbon composite (where nickel nanoparticles had a particle size of 12 nm and a mass percentage of 14%; the nickel-carbon composite had a particle size of 2.0 μm and a density of 0.339 g/cm$^3$).

Example 5

0.418 g of nickel nitrate hexahydrate, 0.58 g of dimethylimidazole, and 1.15 g of trimesic acid were dissolved in 85 mL of DMF. An obtained solution was placed in a 100 mL polytetrafluoroethylene-lined autoclave, and a solvothermal reaction was conducted at 208° C. for 96 h. An obtained material liquid was filtered and washed, and then dried under vacuum at 60° C. to obtain a nickel-based MOF precursor.

The nickel-based MOF precursor was heated at 18° C./min to 700° C. to conduct a heat treatment for 7 h in a mixed atmosphere of hydrogen and argon (the hydrogen and the argon were at a volume ratio of 5:95), to obtain a nickel-carbon composite (where nickel nanoparticles had a particle size of 14 nm and a mass percentage of 17%; the nickel-carbon composite had a particle size of 2.3 μm and a density of 0.372 g/cm$^3$).

Example 6

0.445 g of nickel nitrate hexahydrate, 0.62 g of dimethylimidazole, and 1.09 g of trimesic acid were dissolved in 90 mL of DMF. An obtained solution was placed in a 100 mL polytetrafluoroethylene-lined autoclave, and a solvothermal reaction was conducted at 260° C. for 96 h. An obtained material liquid was filtered and washed, and then dried under vacuum at 60° C. to obtain a nickel-based MOF precursor.

The nickel-based MOF precursor was heated at 5.5° C./min to 680° C. to conduct a heat treatment for 8 h in a mixed atmosphere of hydrogen and argon (the hydrogen and the argon were at a volume ratio of 5:95), to obtain a nickel-carbon composite (where nickel nanoparticles had a particle size of 20 nm and a mass percentage of 20%; the nickel-carbon composite had a particle size of 3.0 μm and a density of 0.376 g/cm$^3$).

Performance Testing

Test Example 1

Figure 1B:
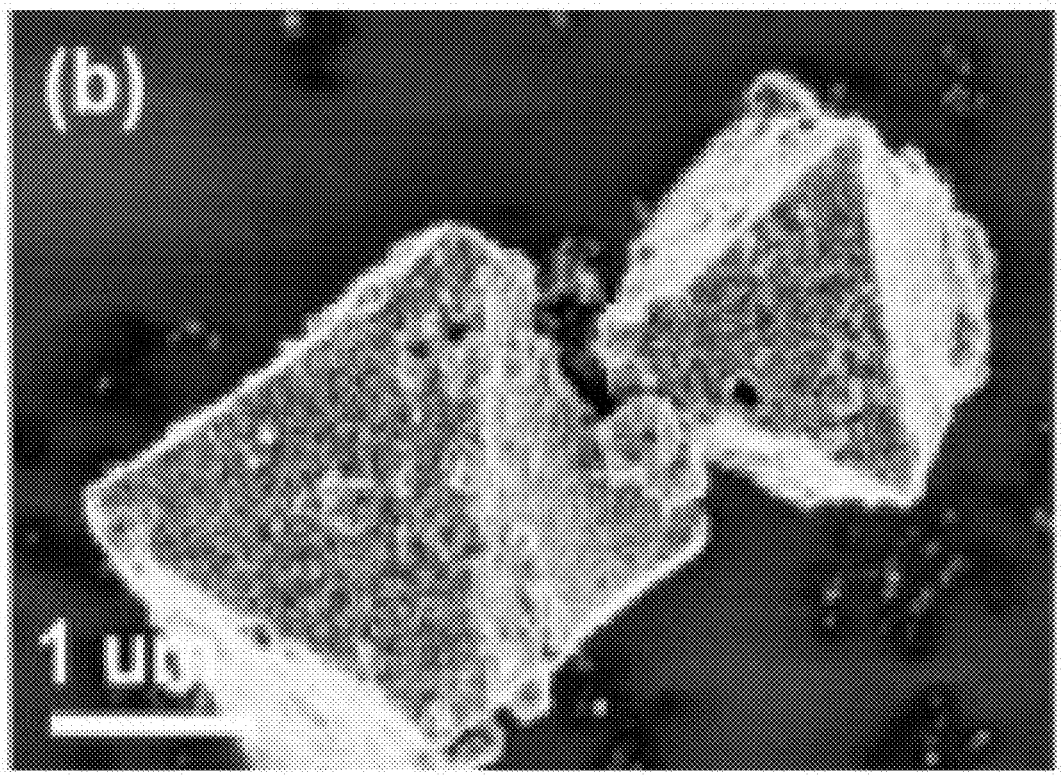
Figure 1C:
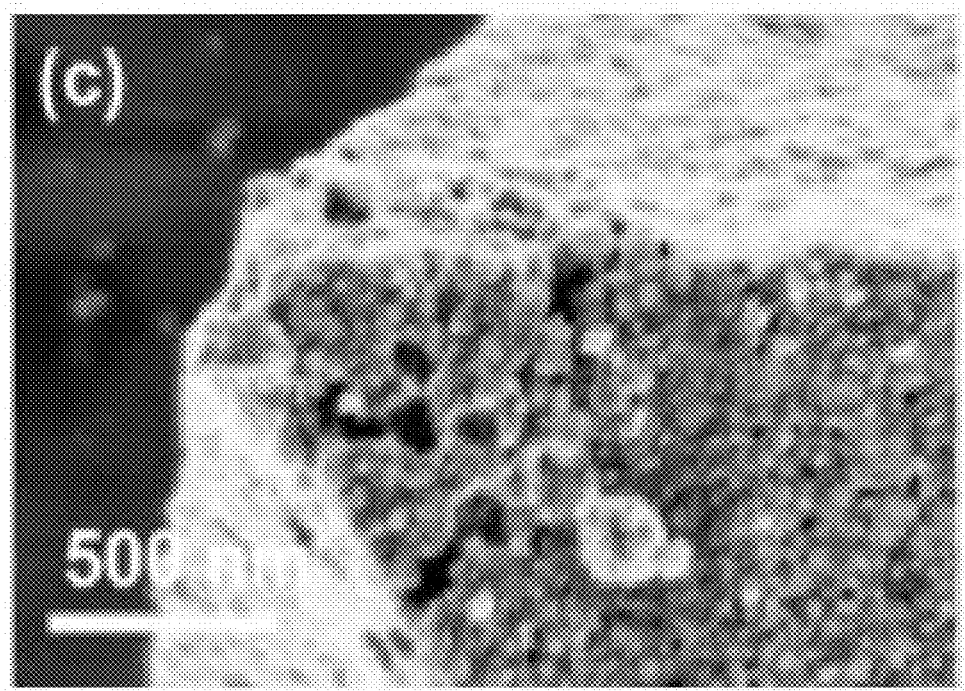

SEM testing was conducted on the nickel-carbon composite obtained in Example 1, and an obtained SEM image was shown in FIGS. 1A-C. It was seen from FIGS. 1A-C that the composite provided by the present disclosure had a rough surface with an average size of 2 μm to 3 μm (a). The composite had many particles at the microscale, building a large number of contact interfaces, including Ni—C and C—C interfaces.

Test Example 2

Figure 2A:
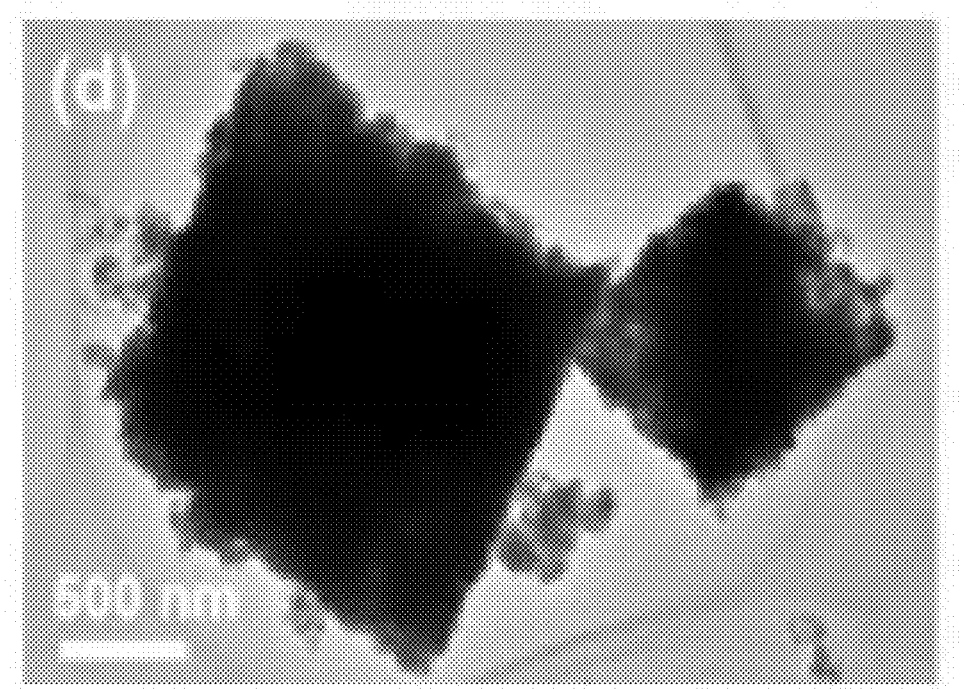
FIGS. 2A-C show transmission electron microscopy (TEM) images of the nickel-carbon composite obtained in Example 1.
Figure 2B:
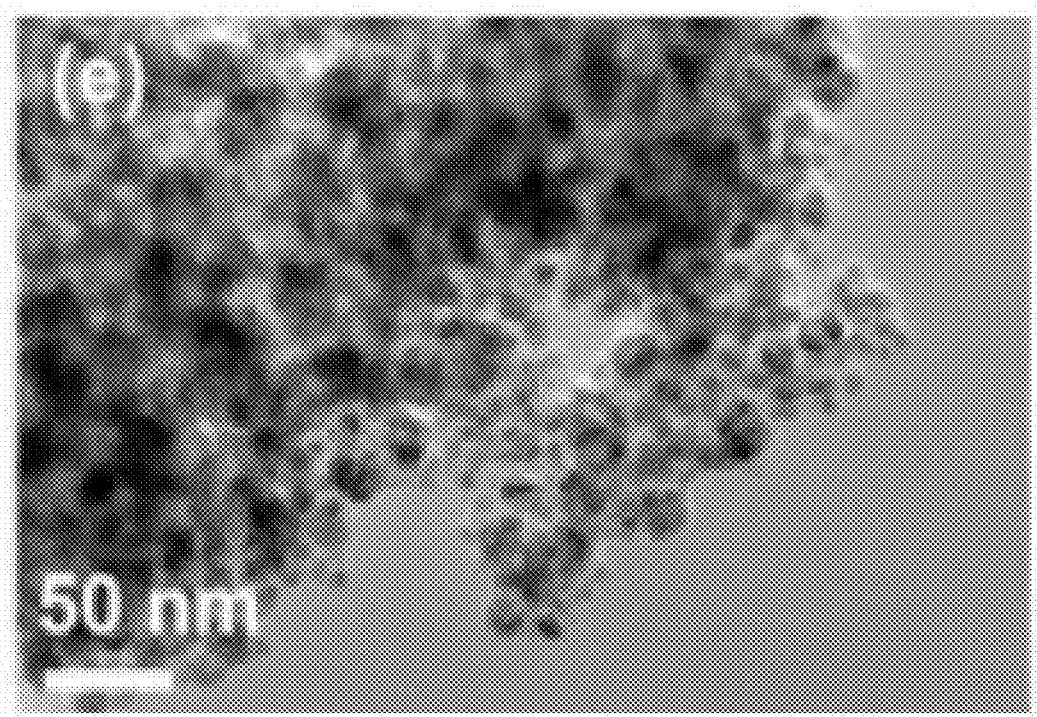
Figure 2C:
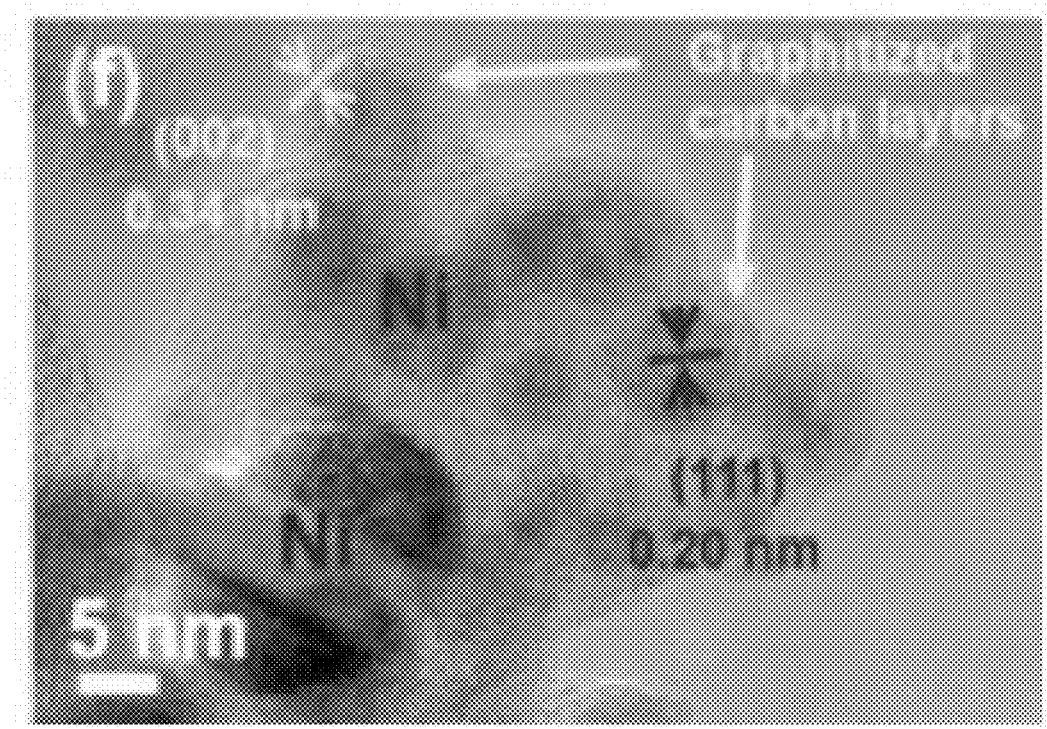

TEM testing was conducted on the nickel-carbon composite obtained in Example 1, and an obtained TEM image was shown in FIGS. 2A-C. It was seen from FIGS. 2A-C that the composite provided by the present disclosure showed a complete octahedral shape (d).

Meanwhile, further observation of a microstructure at the nanoscale through high-resolution transmission electron microscopy (HRTEM) images revealed that the composite was composed of nickel nanoparticles and a carbon matrix (e), and the magnetic nickel nanoparticles were wrapped by graphitized carbon layers (f).

Test Example 3

Figure 3:
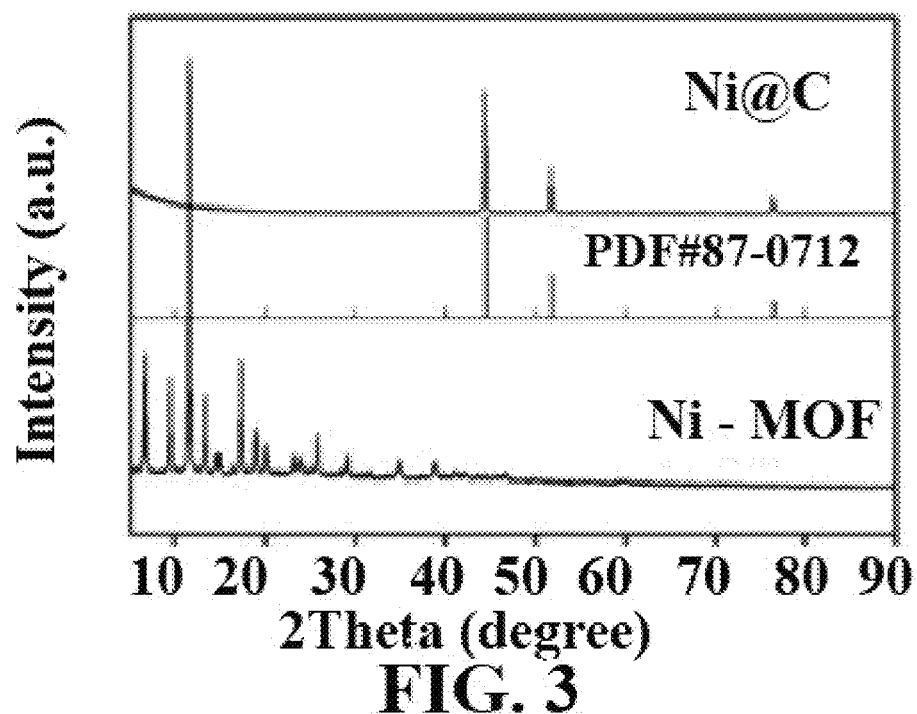
FIG. 3 shows an X-ray diffraction (XRD) pattern of the nickel-carbon composite obtained in Example 1.

XRD testing was conducted on the nickel-carbon composite obtained in Example 1, and an obtained XRD pattern was shown in FIG. 3. It was seen from FIG. 3 that the significant peaks at 2θ=44.45°, 51.83°, and 76.42° belonged to (111), (200), and (220) crystal planes of face-centered cubic Ni (JCPDS: 87-0712), respectively. The nickel-based MOF precursor completed a phase transition process during the heat treatment. Metal cations (Ni+) were transformed into magnetic nickel cores, and organic ligands were transformed into graphitized carbon layers, forming a unique magnetic carbon interface.

Test Example 4

Figure 4A:
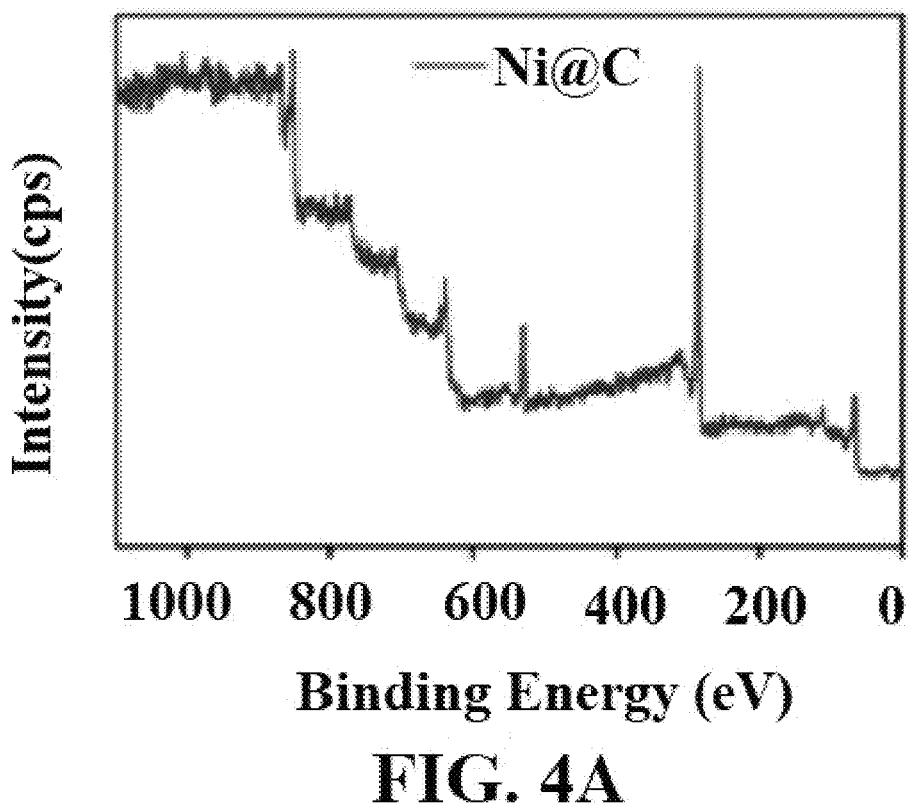
FIGS. 4A-C show X-ray photoelectron spectroscopy (XPS) patterns of the nickel-carbon composite obtained in Example 1.
Figure 4B:
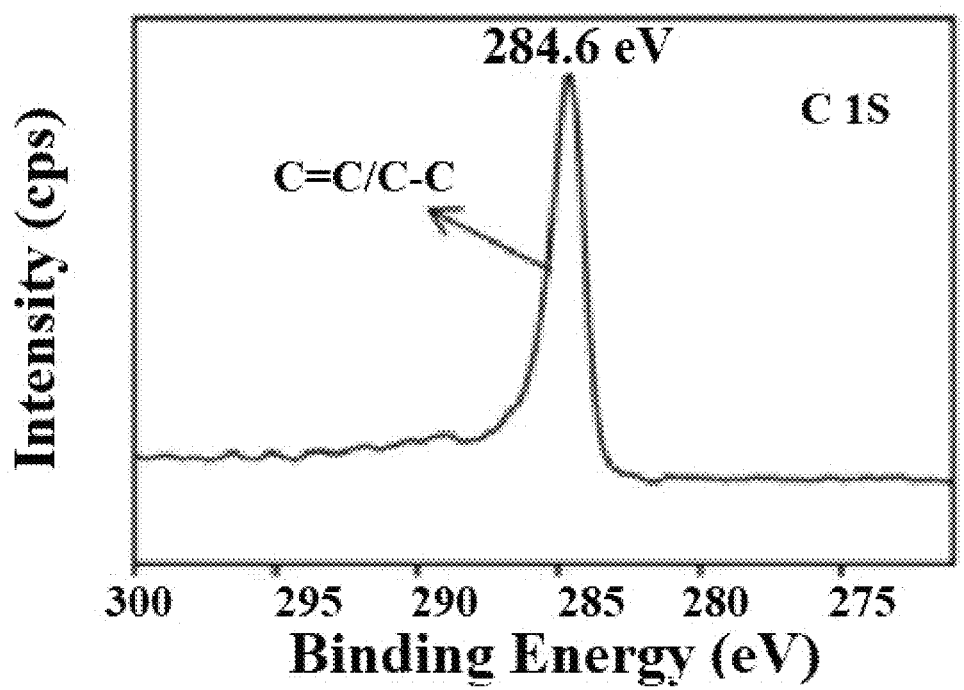
Figure 4C:
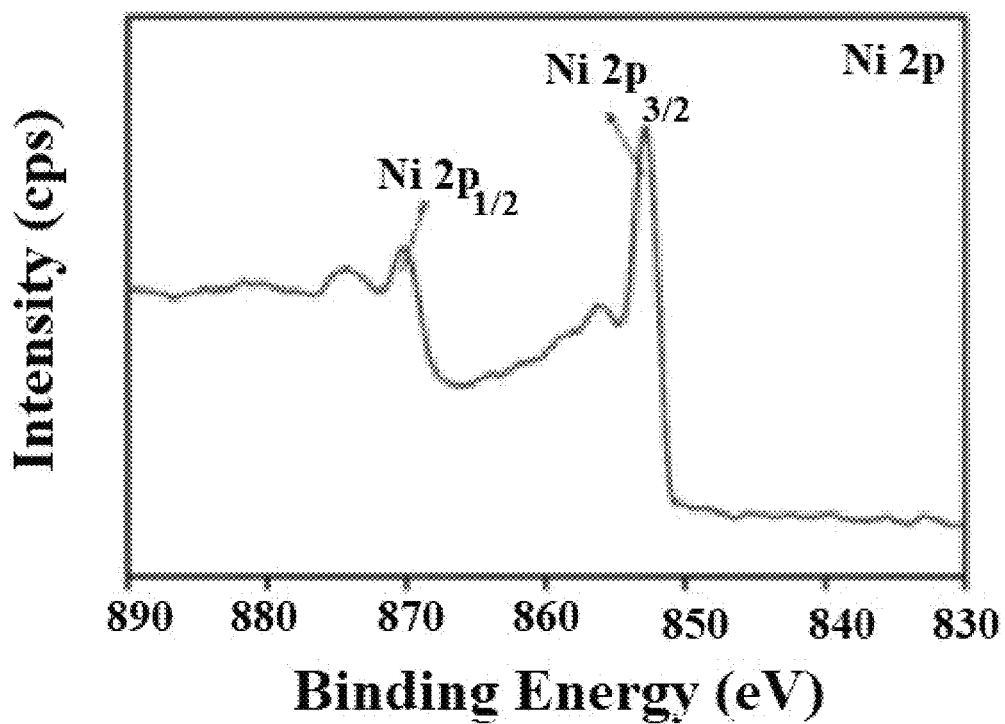

XPS testing was conducted on the nickel-carbon composite obtained in Example 1, and an obtained XPS pattern was shown in FIGS. 4A-C. It was seen from FIGS. 4A-C that the composite provided by the present disclosure contained Ni and C elements. The peak at 284.6 eV belonged to C—C/C═C, and the peaks at 852.9 eV and 870.2 eV corresponded to nickel metal.

Test Example 5

Figure 5:
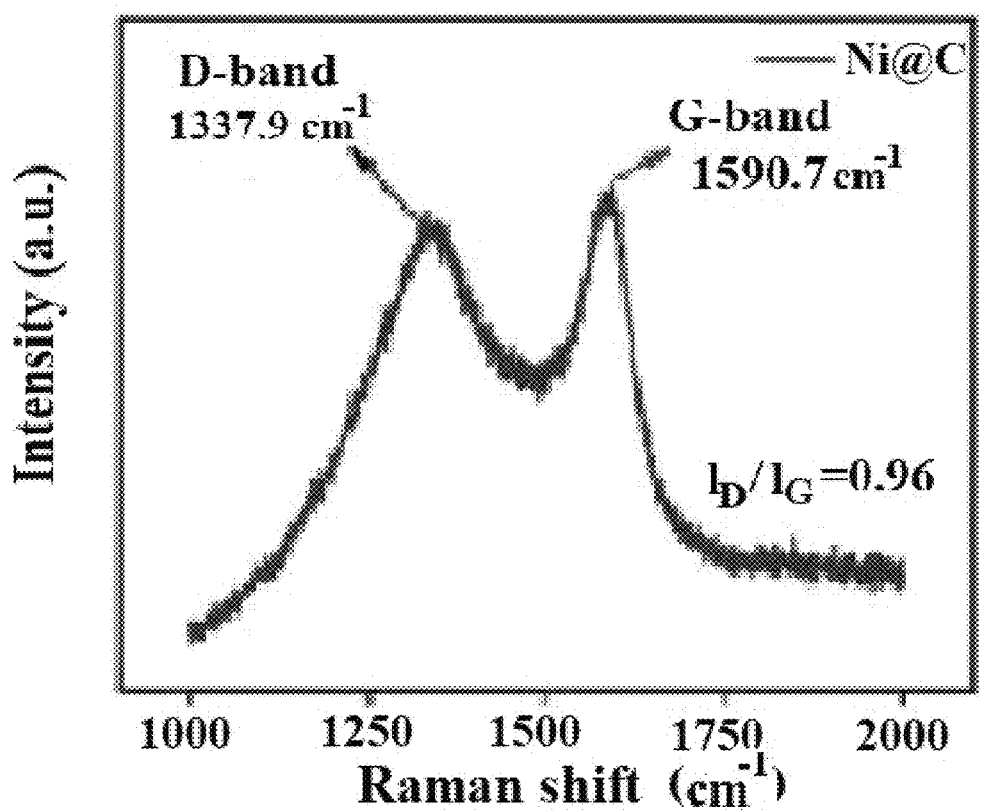
FIG. 5 shows a Raman spectrogram of the nickel-carbon composite obtained in Example 1.
Figure 6:
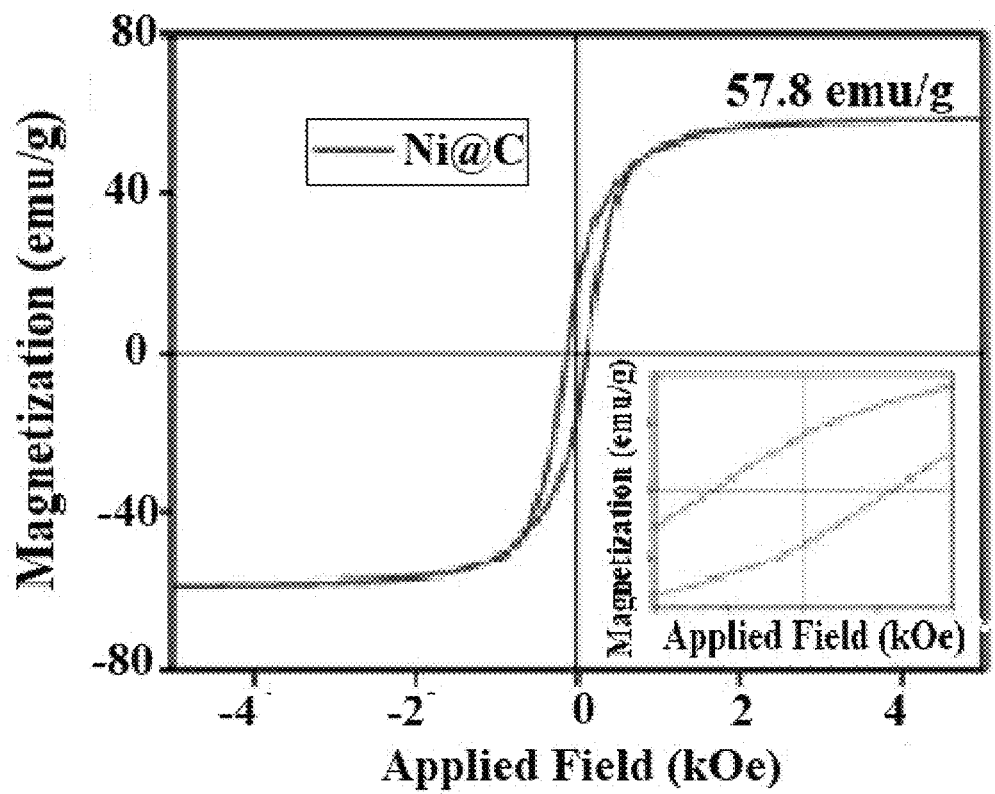
FIG. 6 shows a hysteresis loop of the nickel-carbon composite obtained in Example 1.

The nickel-carbon composite obtained in Example 1 was tested for Raman spectroscopy and magnetic properties, and obtained test results were shown in FIG. 5 to FIG. 6. FIG. 5 showed a Raman spectrogram. It was seen from FIG. 5 that the nickel-carbon composite provided by the present disclosure had a relatively high ID/IG (0.96), indicating that there was a relatively high electron transport capability, which was beneficial to conduction loss and microwave energy conversion.

FIG. 6 showed a hysteresis loop. It was seen from FIG. 6 that the composite had a typical hysteresis loop with a saturation magnetization (Ms) of 57.8 emu·g−1.

Test Example 6

The electromagnetic properties of the nickel-carbon composite obtained in Example 1 were tested.

The nickel-carbon composite and paraffin were pressed into a coaxial ring with an outer diameter of 7.00 mm and an inner diameter of 3.04 mm separately according to a mass ratio of 1:4, 1:1, and 4:1; obtained three samples with different addition amounts (20%, 50%, and 80%) were labeled as Ni@C-1, Ni@C-2, and Ni@C-3, respectively.

The electromagnetic parameters were determined at a frequency of 2 GHz to 18 GHz using an AV-3629D vector network analyzer (CETC 41 Research Institute, China).

Figure 7A:
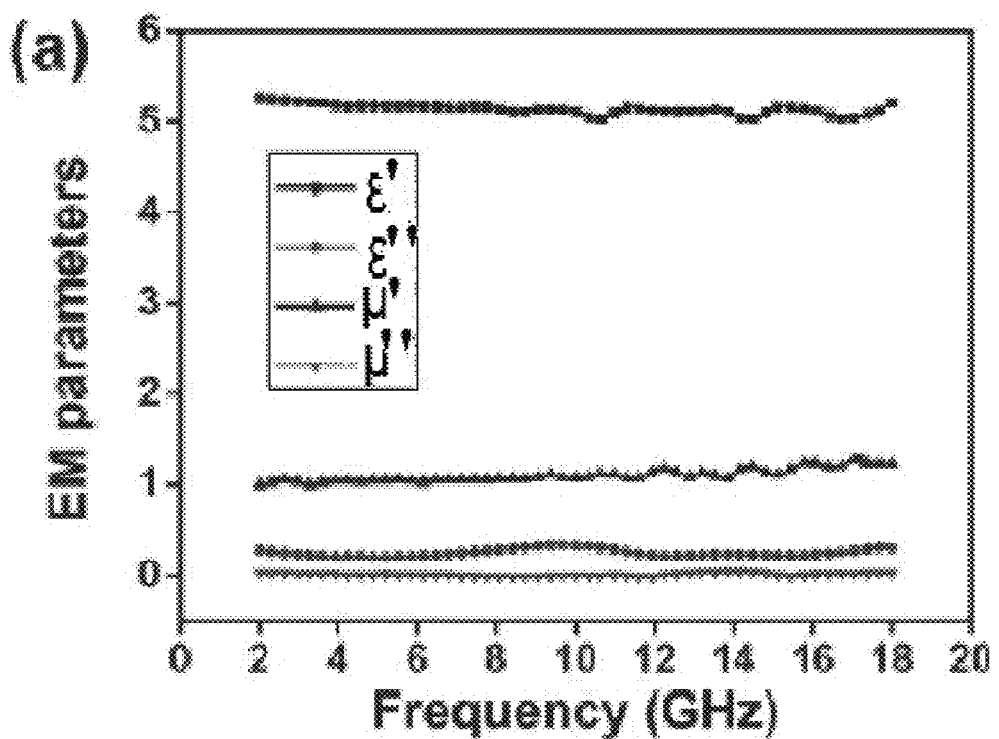
FIGS. 7A-I show electromagnetic performance test of Ni@C-1, Ni@C-2, and Ni@C-3 obtained in Test Example 6, where
Figure 7B:
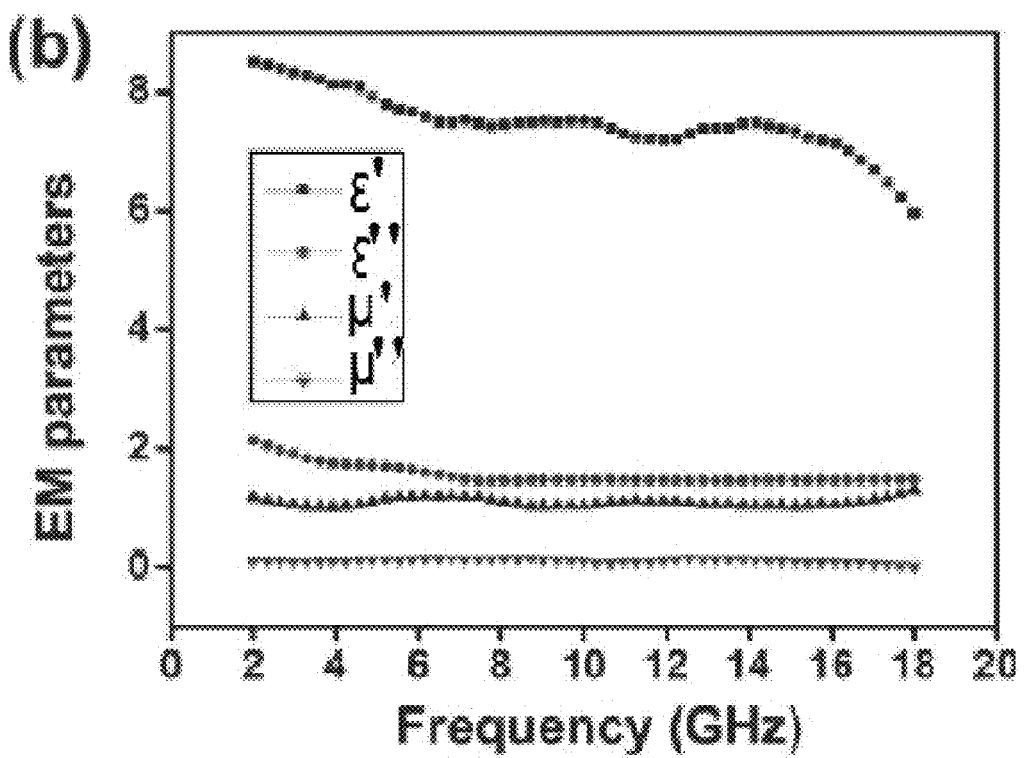
Figure 7C:
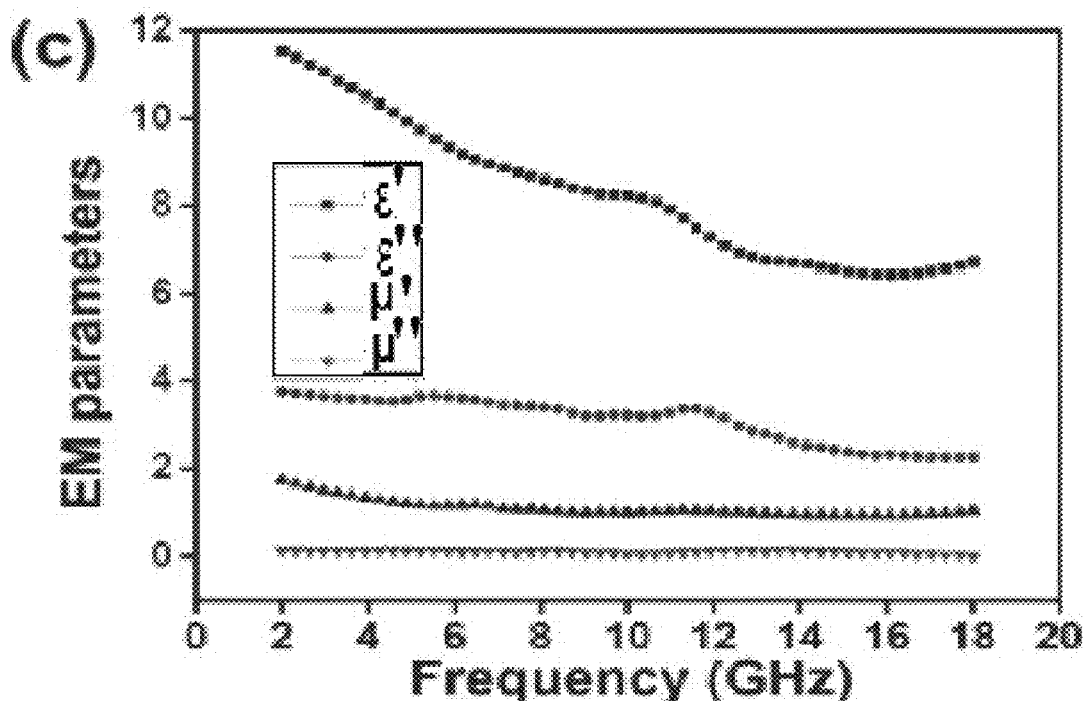
Figure 7D:
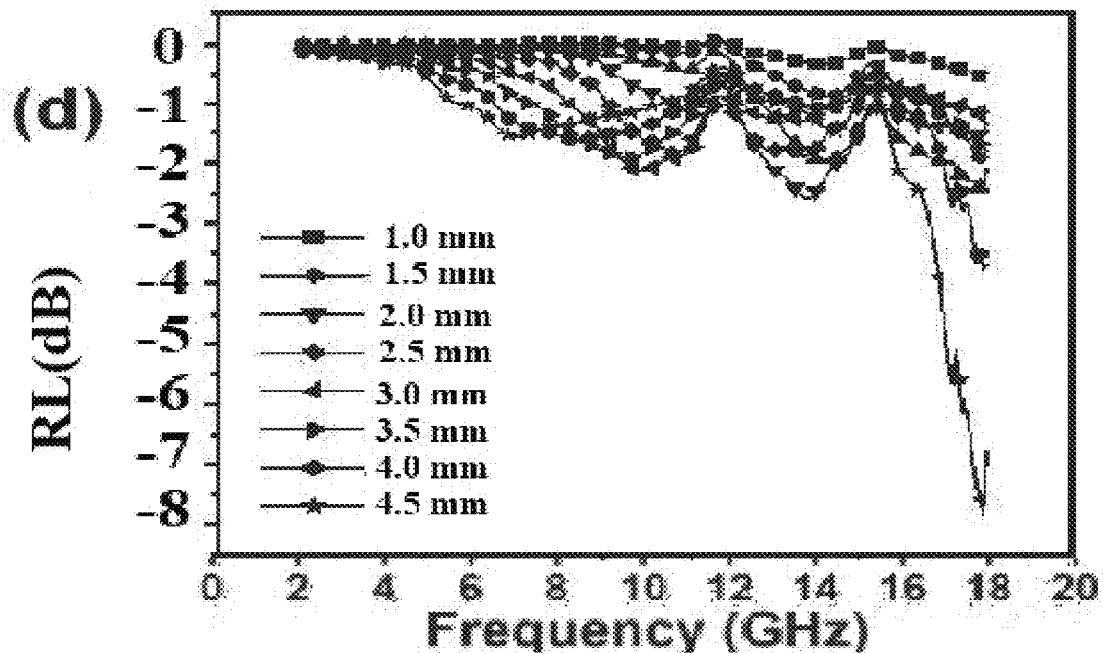
Figure 7E:
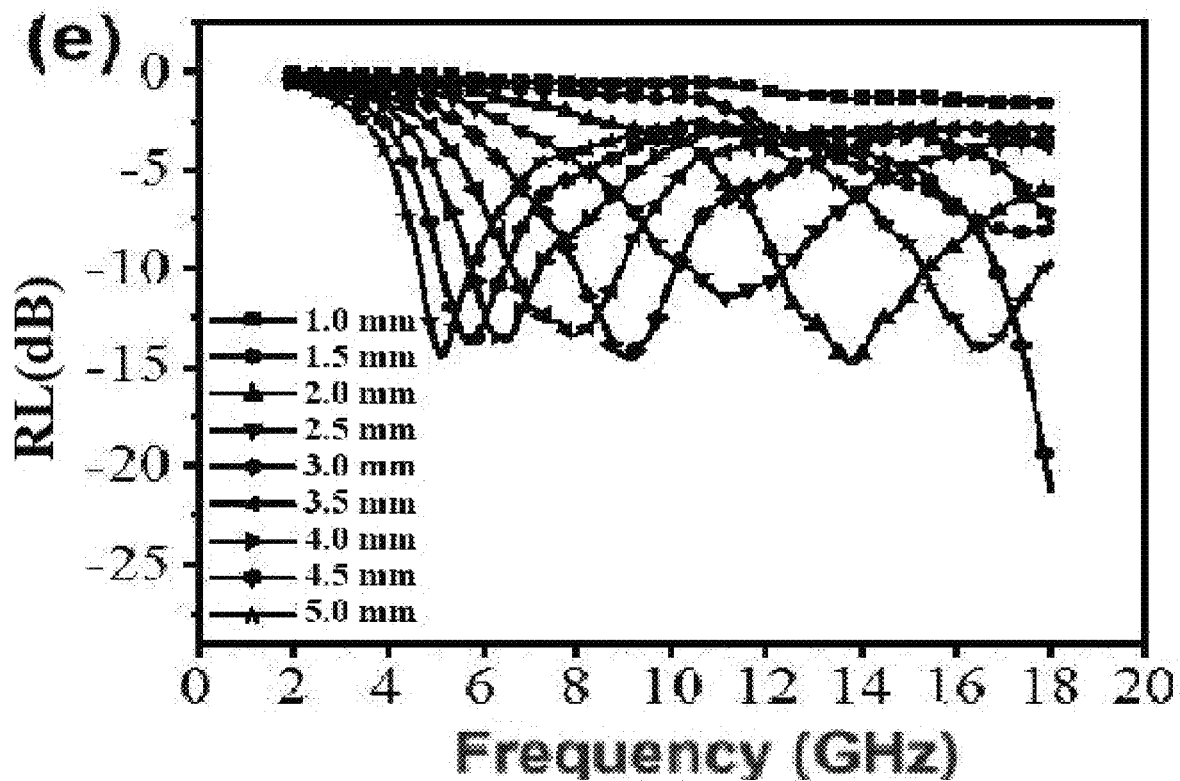
Figure 7F:
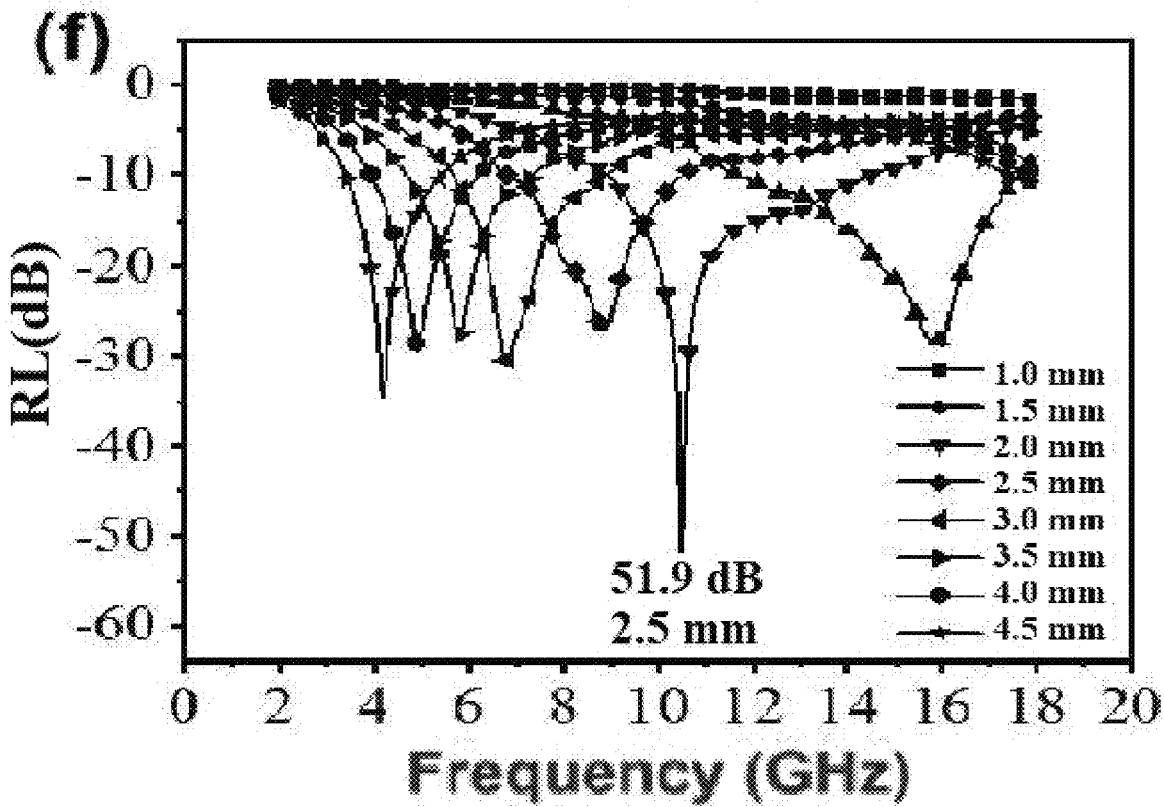

FIG. 7a to FIG. 7c were electromagnetic parameters; FIG. 7d to FIG. 7f were reflection losses; and FIG. 7g to FIG. 7i were Cole-Cole curves.

FIG. 7A to FIG. 7C were electromagnetic parameters; FIG. 7D to FIG. 7F were reflection losses; and FIG. 7G to FIG. 7I were Cole-Cole curves.

Figure 7G:
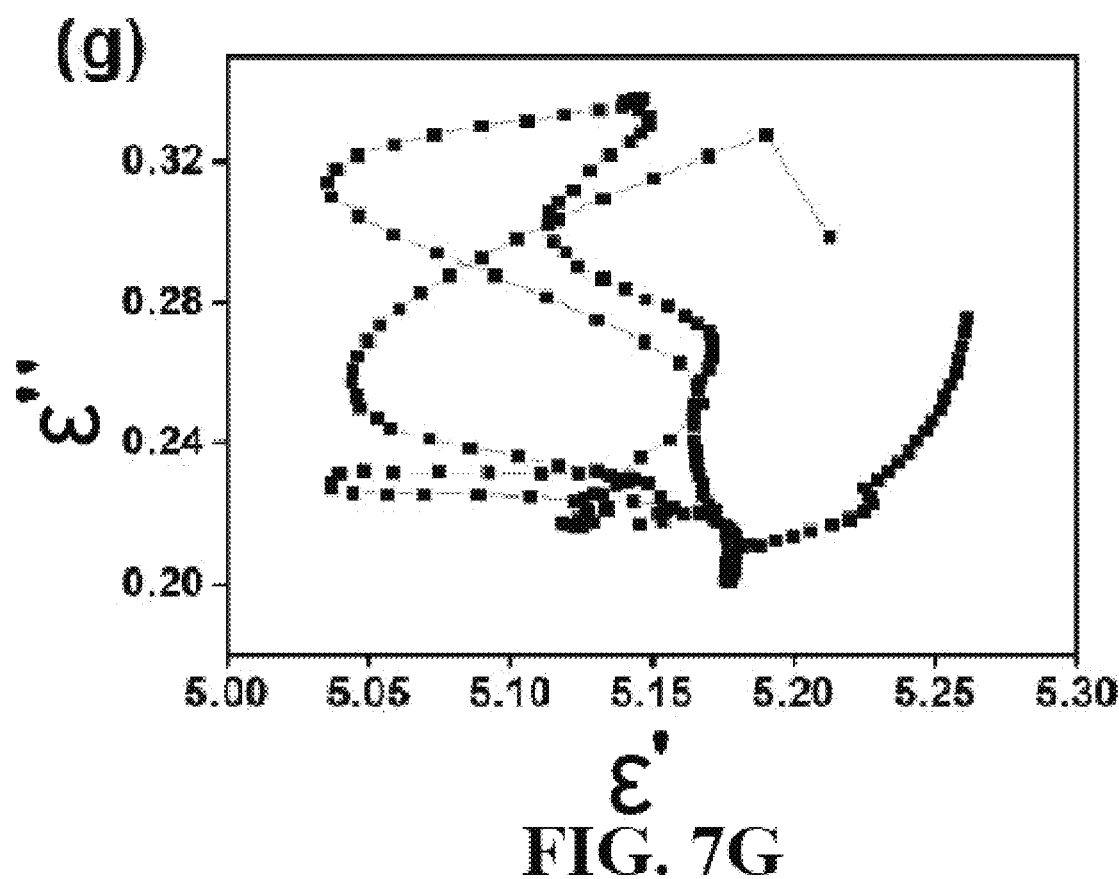
Figure 7H:
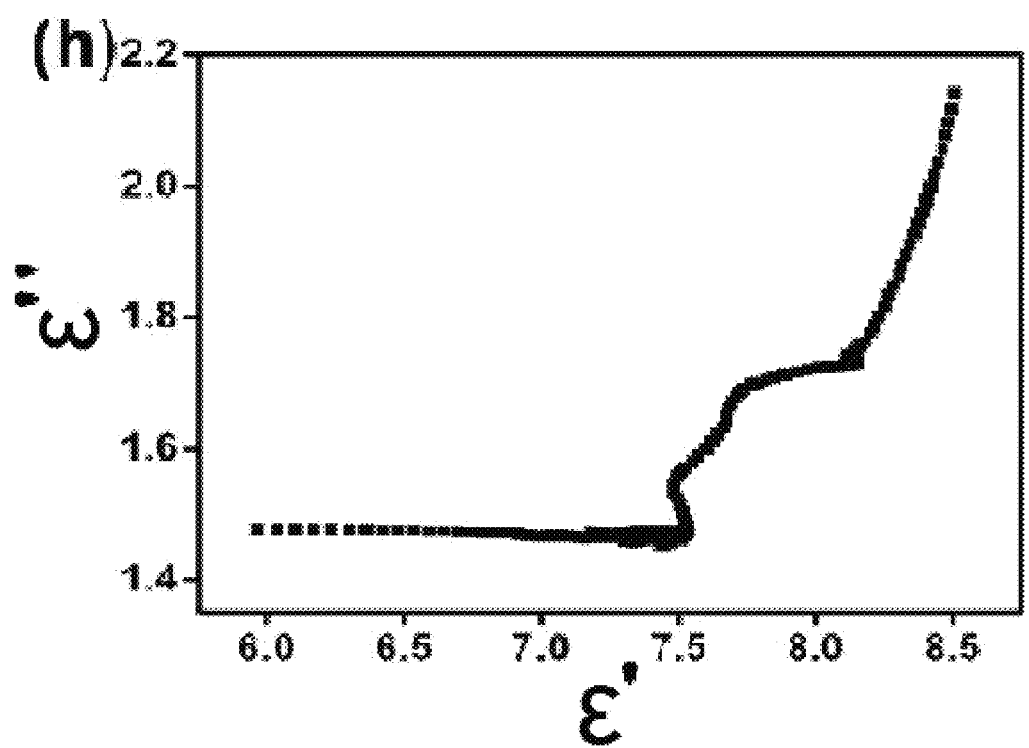
Figure 7I:
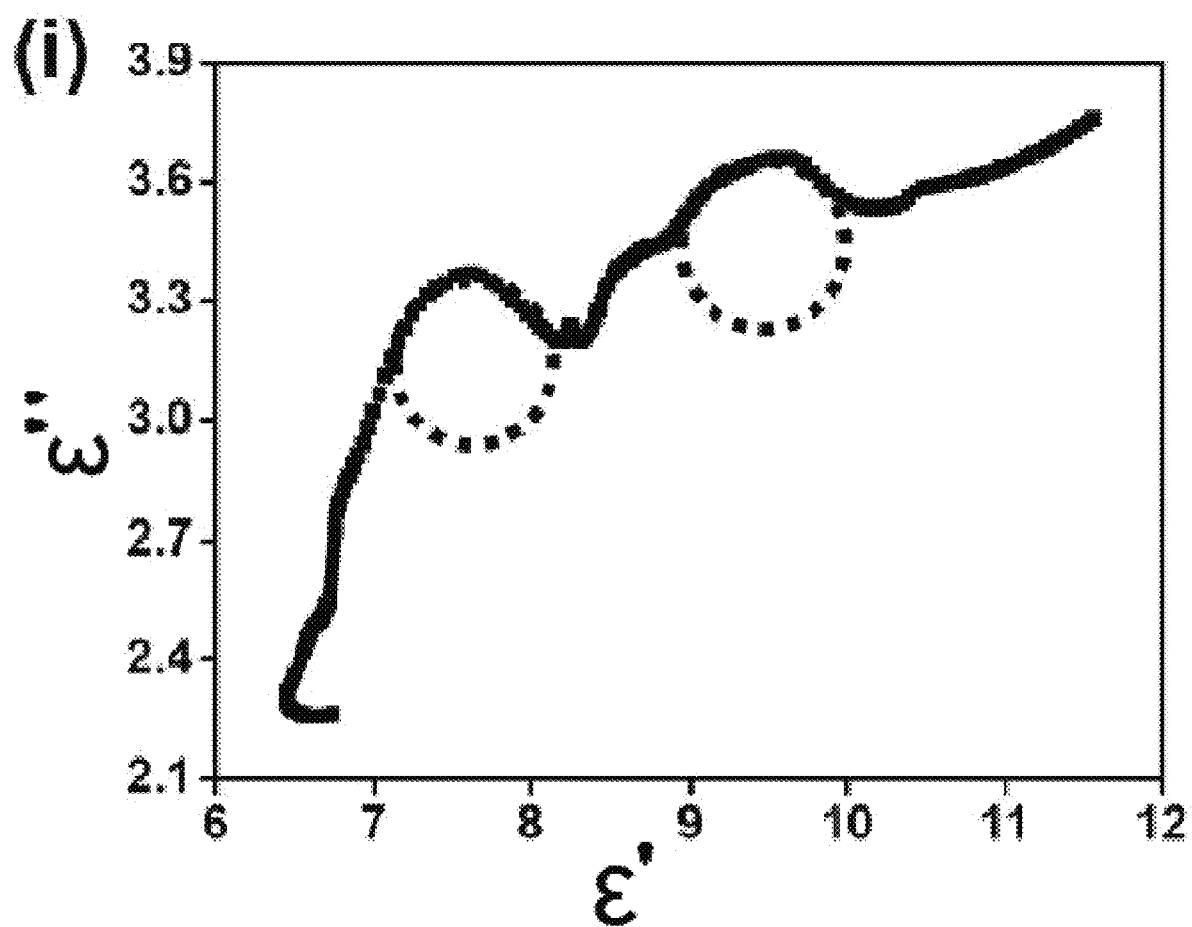

FIG. 7A, FIG. 7D, and FIG. 7G were the Ni@C-1, FIG. 7B, FIG. 7E, and FIG. 7H were the Ni@C-2, and FIG. 7C, FIG. 7F, and FIG. 7I were the Ni@C-3. It was seen from FIG. 7A to FIG. 7C that real part values ($\varepsilon'$) of a dielectric constant were 5.3 to 5.0, 8.5 to 5.9, and 11.6 to 6.7 under different addition amounts; and imaginary part values ($\varepsilon''$) of the dielectric constant also showed a similar downward trend. The $\varepsilon''$ values of the Ni@C-1, the Ni@C-2, and the Ni@C-3 decreased from 0.28, 2.1, and 3.8 to 0.23, 1.5, and 2.3, respectively. Both the real and imaginary parts ($\mu'$ and $\mu''$) of the permeability exhibited frequency-dependent features. The real and imaginary parts of the permeability of the Ni@C-3 sample with a high addition amount at the initial frequency were high, which were 1.7 and 0.13, respectively. The Ni@C-3 had relatively high & value and dielectric loss tangent value, indicating that the material had a strong microwave absorption capacity.

At 18.0 GHZ, the Ni@C-1 had a minimum reflection loss (RLmin) of 7.9 dB, showing a weak microwave dissipation capability (FIG. 7D and FIG. 7G). The Ni@C-2 exhibited a strong loss capability and a better effective absorption bandwidth (EAB), RLmin reached 21.4 dB at 4.5 mm, and EAB reached 3.2 GHz at 2.0 mm (FIG. 7E and FIG. 7H). By further increasing a mass fraction of the composite to 80%, the Ni@C-3 exhibited an excellent microwave absorption performance (FIG. 7F and FIG. 7I), RLmin reached 51.9 dB at 2.5 mm, and EAB increased by 5.6 GHz (8.9 GHz to 14.5 GHZ) at a same thickness.

Figure 8A:
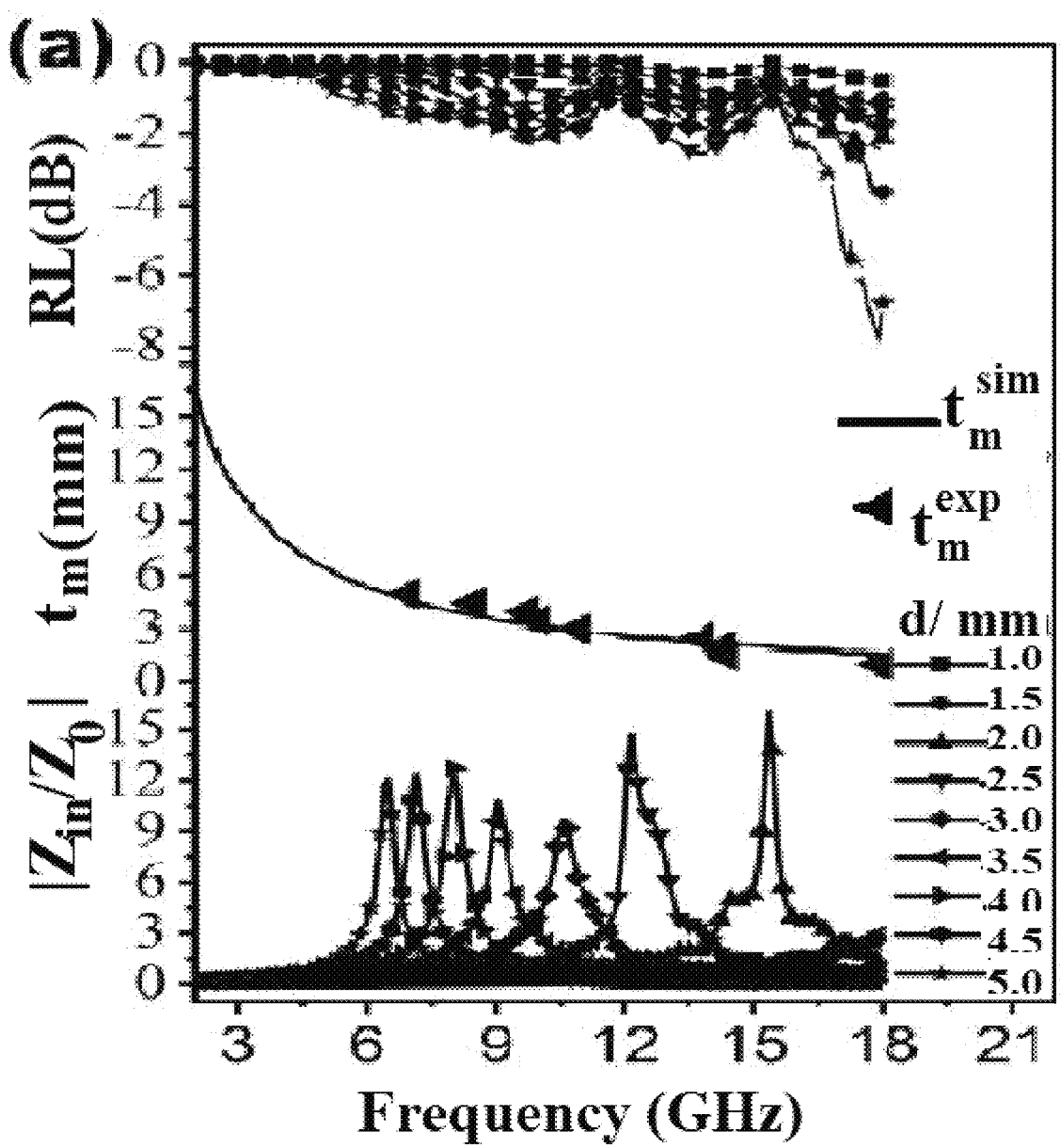
FIGS. 8A-C show relationship curves of RL, tm, and |Zin/Z0| with a frequency f for the Ni@C-1, the Ni@C-2, and the Ni@C-3 in Test Example 6.
Figure 8B:
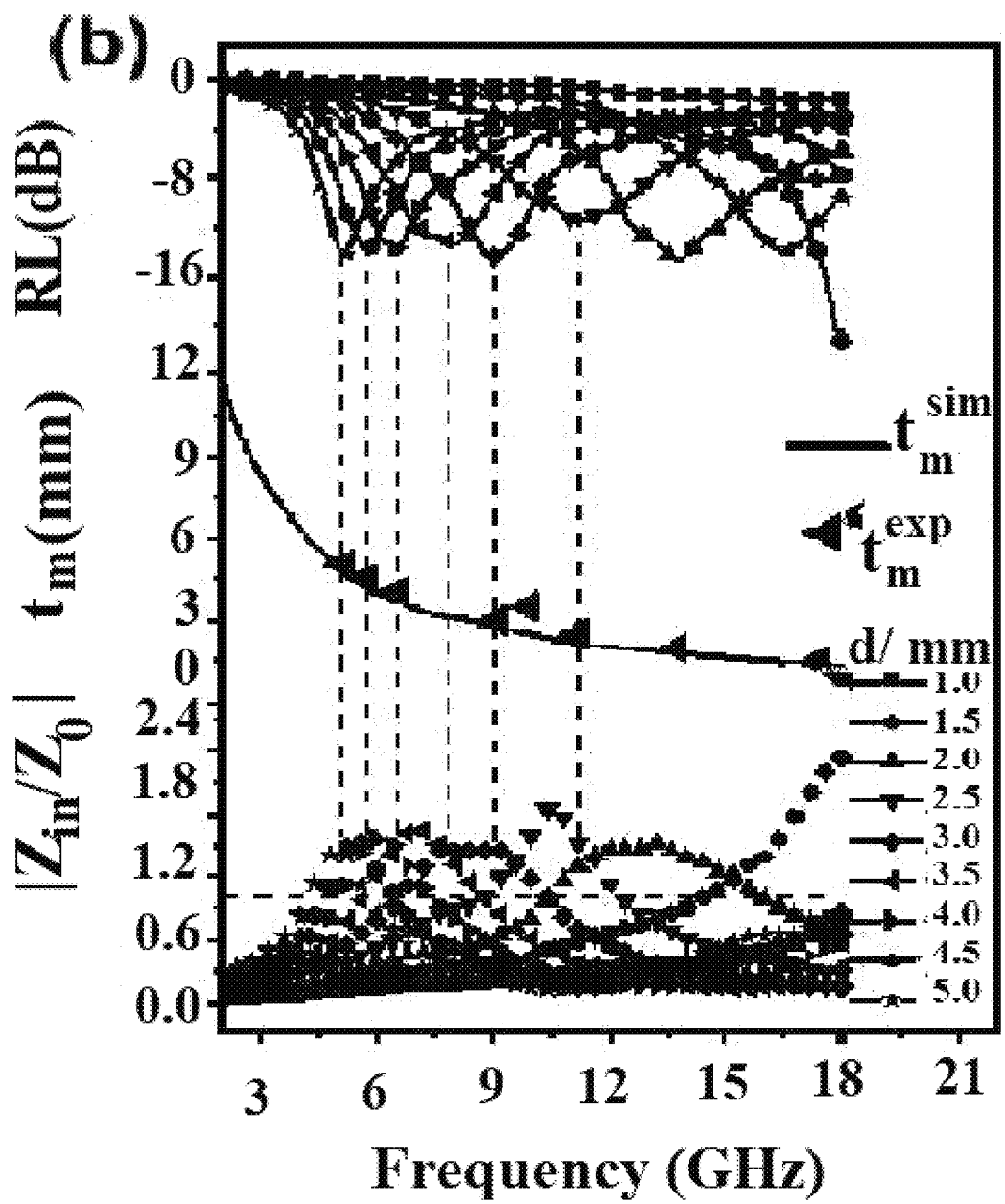
Figure 8C:
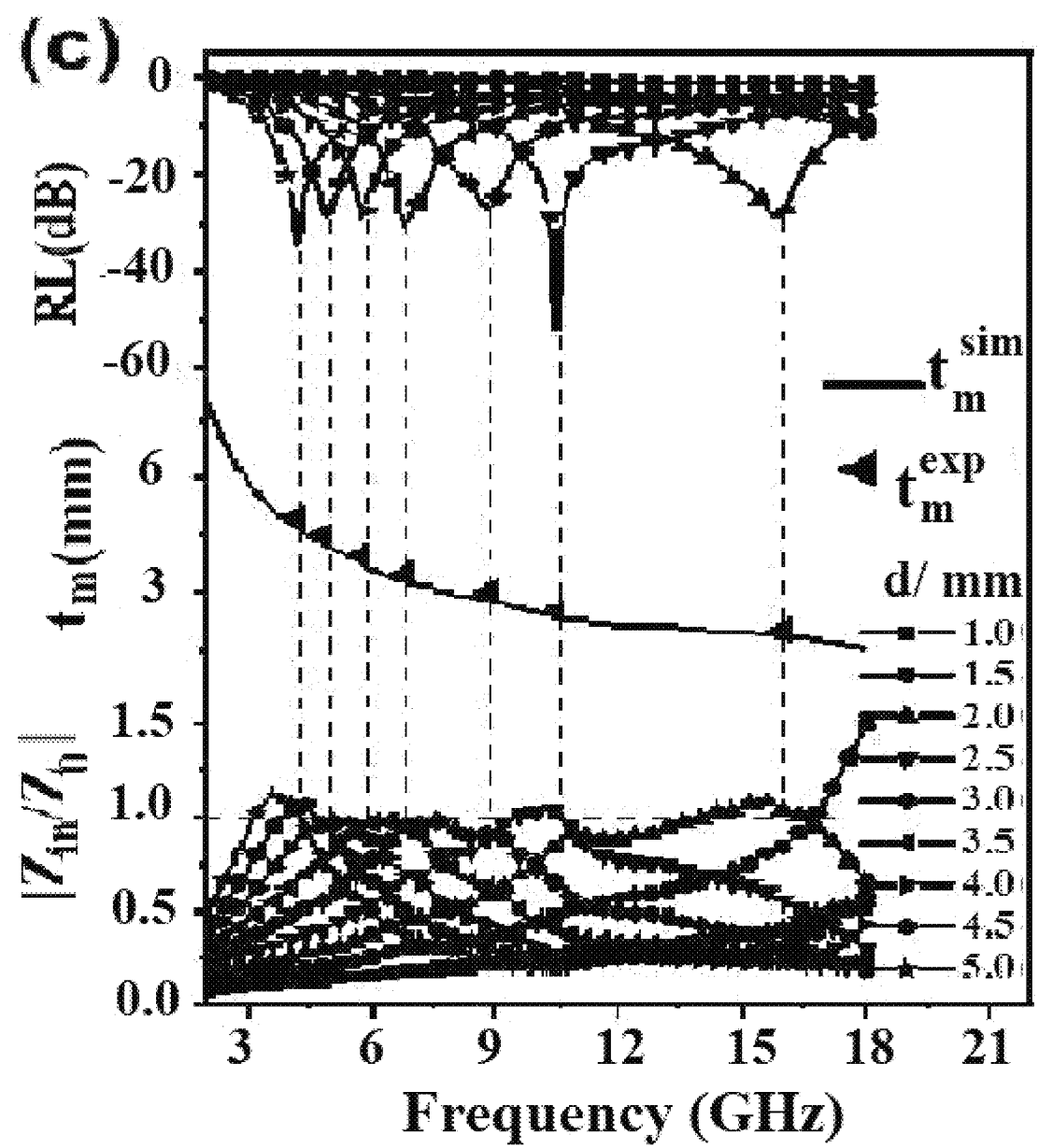

FIGS. 8A-C showed relationship curves of RL, tm, and |Zin/Z0| with a frequency f, where FIG. 8A was the Ni@C-1, FIG. 8B was the Ni@C-2, and FIG. 8C was the Ni@C-3. It was seen from FIGS. 8A-C that when a matching thickness was 2.5 mm and an impedance matching rate |Zin/Z0| was 1.00, the frequency was 10.50 GHz (FIG. 8C), which were also a frequency fm and a thickness tm corresponding to the RLmin of the composite. The |Zin/Z0| value of the Ni@C-3 was close to 1.00, while the |Zin/Z0| values of the Ni@C-2 and Ni@C-1 were both greater than 1.5. These results indicated that the Ni@C-3 had better impedance matching than that of the Ni@C-1 and Ni@C-2 absorbers.

In the present disclosure, under appropriate electromagnetic parameters, by adjusting the amount of Ni@C added, the incident microwave could easily penetrate the absorber instead of being reflected into the space on an active surface of the absorber. That is to say, the nickel-carbon composite had desirable impedance matching that met the most important impedance matching requirements. Secondly, high-saturation magnetization Ms (57.8 emu g−1) and low coercive force Hc could increase the composite magnetic permeability ($\mu'$, $\mu''$), thereby enhancing the magnetic storage and decay capabilities. The nickel core inside the material had various magnetic loss characteristics such as natural resonance and eddy current loss. Thirdly, high-frequency microwaves interacted with the nickel-carbon composite. The graphitized carbon layer as a shell layer could provide a directional electron migration path in a special octahedral space structure, and an MOF-derived carbon shell with defects could construct a conductive network and sufficient polarization sites. These contributed to conduction loss and polarization loss. In addition, a heterojunction Ni—C interface appeared in the system, which enhanced the interfacial polarization. A formed Cole-Cole semicircle indicated the existence of Debye relaxation, which was beneficial to induce other dielectric losses. Moreover, microwave energy attenuation was caused by charged particles overcoming thermal motion under the action of electric field force, whereby microwave energy was completely converted into thermal energy.

Compared with the electromagnetic wave-absorbing materials with magnetic-electric co-loss mechanism in the prior art, under the minimum thickness, the nickel-carbon composite provided by the present disclosure had stronger RL capacity and wider EAB (as shown in Table 1, RLmin indicated a minimum reflection loss value, tRL indicated a thickness of the absorber when the minimum reflection loss value was reached, fB indicated a maximum EAB, and tF indicated a thickness of the absorber when the maximum EAB was reached). This showed that the nickel-carbon composite provided by the present disclosure was a high-performance electromagnetic wave-absorbing material.

TABLE 1

Performance comparison of electromagnetic wave-absorbing materials.

|  | $RL_{min}$/dB | $t_{RL}$/mm | $f_B$/GHz | $t_F$/mm |
| --- | --- | --- | --- | --- |
| CoMn@CN | −39.9 | 2.5 | 5.24 | 2.0 |
| CoFe$_2$O$_4$@C/rGO | −52.5 | 2.0 | 5.68 | 1.7 |
| Fe—Fe$_3$O$_4$@C | −51 | 1.2 | 5.1 | 1.2 |
| Fe$_3$O$_4$/C/CG | −45.1 | 3.5 | 2.2 | 3.5 |
| Ni@NC | −37.11 | 2.3 | 6.21 | 2.3 |
| Co/C | −52.8 | 1.4 | 4.5 | 1.4 |
| Nickel-carbon composite | −51.9 | 2.5 | 5.6 | 2.5 |

Although the present disclosure is described in detail in conjunction with the foregoing examples, they are only a part of, not all of, the examples of the present disclosure. Other examples can be obtained based on these examples without creative efforts, and all of these examples shall fall within the protection scope of the present disclosure.

What is claimed is:

1. A nickel-carbon composite, comprising a plurality of modified carbon particles, wherein each of the modified carbon particles comprises a nickel nanoparticle core and a carbon layer wrapped on a surface of the nickel nanoparticle core; and
   a plurality of the modified carbon particles has an octahedral structure wherein the nickel-carbon composite has a density of 0.318 g/cm$^3$ to 0.389 g/cm$^3$.

2. The nickel-carbon composite according to claim 1, wherein the octahedral structure has an edge length of 0.5 μm to 2.0 μm.

3. The nickel-carbon composite according to claim 1, wherein the nickel nanoparticle has a particle size of 5 nm to 20 nm.

4. The nickel-carbon composite according to claim 1, wherein the nickel nanoparticles have a mass percentage of 5% to 20% in the nickel-carbon composite.

5. The nickel-carbon composite according to claim 1, wherein the nickel-carbon composite has a particle size of 0.7 μm to 3.0 μm.

6. A wave-absorbing material, comprising the nickel-carbon composite according to claim 1.

\* \* \* \* \*